United States Patent
Ito et al.

[11] Patent Number: 5,880,881
[45] Date of Patent: Mar. 9, 1999

[54] REAL IMAGE MODE FINDER OPTICAL SYSTEM

[75] Inventors: Kazumi Ito, Mitaka; Yasuzi Ogata, Akiruno, both of Japan

[73] Assignee: Olympus Optical Co., Ltd., Tokyo, Japan

[21] Appl. No.: 818,014

[22] Filed: Mar. 14, 1997

[30] Foreign Application Priority Data

Mar. 15, 1996 [JP] Japan .................................. 8-059109

[51] Int. Cl.$^6$ .................................................. G02B 15/14
[52] U.S. Cl. .......................... 359/431; 359/362; 359/422
[58] Field of Search .................... 359/362, 692, 359/420–422, 431–433, 676, 708; 396/373–386

[56] References Cited

U.S. PATENT DOCUMENTS

| | | | |
|---|---|---|---|
| 4,969,723 | 11/1990 | Kato et al. | 359/422 |
| 5,052,787 | 10/1991 | Sugawara | 359/683 |
| 5,184,252 | 2/1993 | Miyauchi et al. | 359/715 |
| 5,206,675 | 4/1993 | Miyauchi et al. | 396/382 |
| 5,231,534 | 7/1993 | Kato | 359/432 |
| 5,257,129 | 10/1993 | Morooka et al. | 359/432 |
| 5,311,355 | 5/1994 | Kato | 359/432 |
| 5,448,400 | 9/1995 | Kikuchi et al. | 359/432 |
| 5,448,411 | 9/1995 | Morooka | 359/432 |
| 5,576,889 | 11/1996 | Miyazaki | 359/686 |

FOREIGN PATENT DOCUMENTS

| | | | |
|---|---|---|---|
| 63-226616 | 9/1988 | Japan . | |
| 3-289611 | 12/1991 | Japan . | |
| 6-160709 | 6/1994 | Japan . | 359/432 |
| 6-300966 | 10/1994 | Japan . | |
| 7-128591 | 5/1995 | Japan . | |

*Primary Examiner*—Thong Nguyen
*Attorney, Agent, or Firm*—Pillsbury Madison & Sutro LLP

[57] ABSTRACT

A real image mode finder optical system has an objective system constructed with an objective lens including a single lens with positive refracting power and a first reflecting member; an intermediate image plane; and an ocular system constructed with a second reflecting member and an eyepiece including a single lens with positive refracting power. This finder optical system satisfies the following conditions:

$$-4 < r1/r2 < -1,\ r2 < 0$$

where $r_1$ and $r_2$ are radii of curvature of the surfaces of the objective lens which are located on the object and image sides, respectively.

12 Claims, 6 Drawing Sheets

FIG. 6
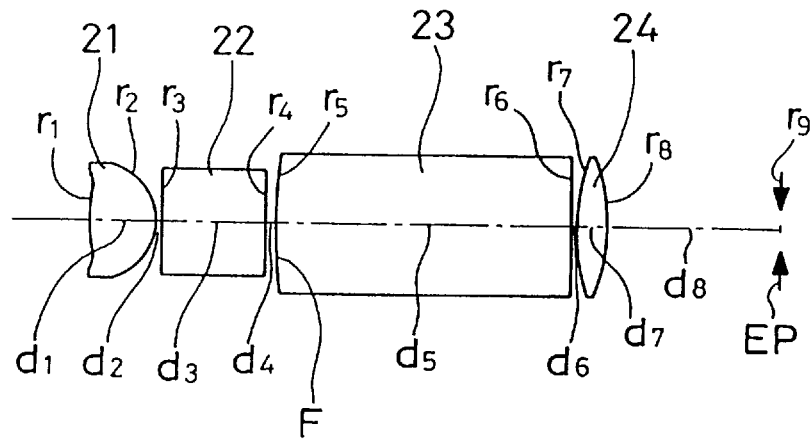
FIG. 7A
φ = 4mm
FIG. 7B
ω = 27.09°
FIG. 7C
ω = 27.09°
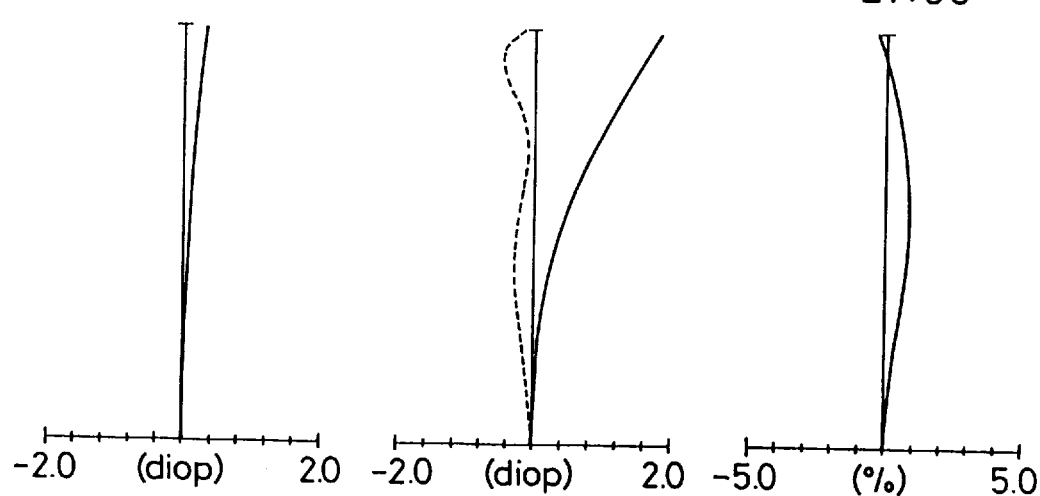

FIG. 8
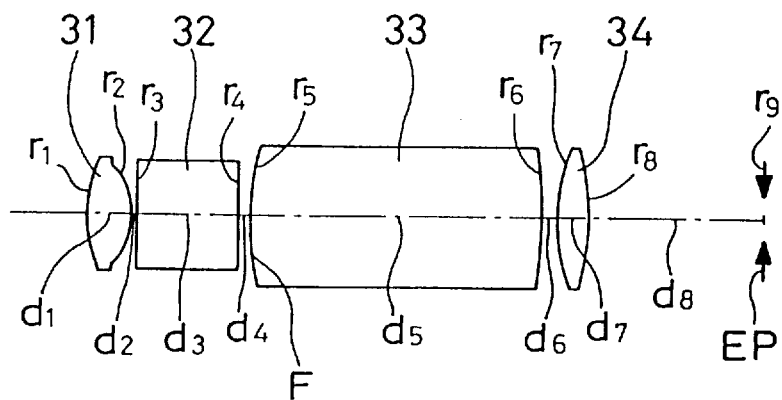
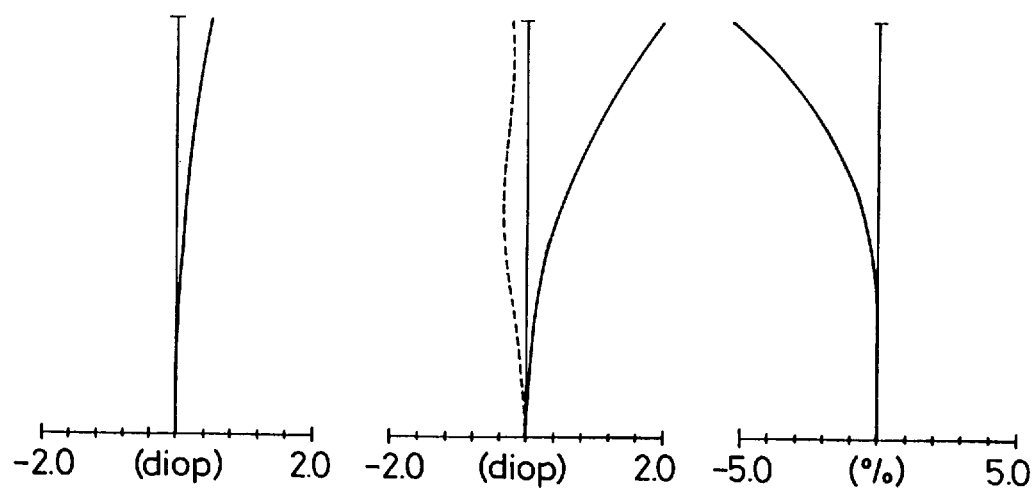
FIG. 9A
φ = 5mm
FIG. 9B
ω = 28.34°
FIG. 9C
ω = 28.34°

FIG. 10
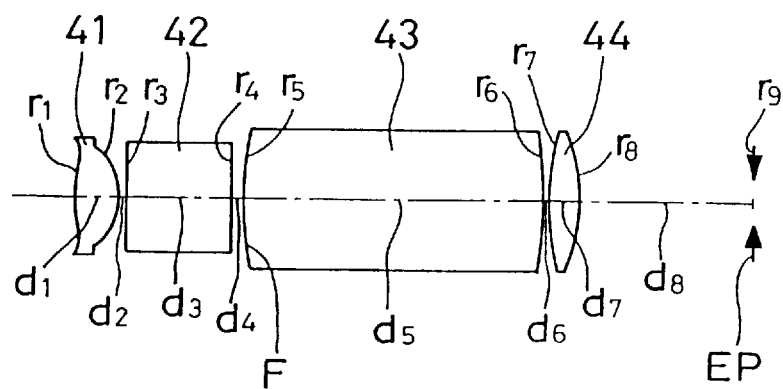
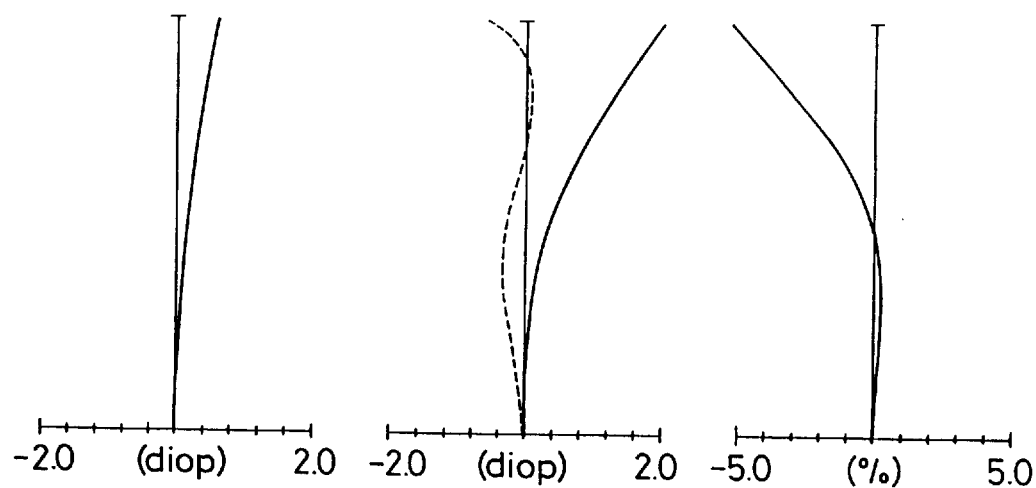

φ = 4mm   ω = 28.35°   ω = 28.35°

REAL IMAGE MODE FINDER OPTICAL SYSTEM

BACKGROUND OF THE INVENTION

1. Field of the Invention

This invention relates to a real image mode finder optical system suitable for a lens shutter camera and the like in which a finder optical system is constructed to be independent of a photographing optical system.

2. Description of Related Art

Real image mode finders are designed so that a field frame Is placed adjacent to an intermediate image plane of an objective system, which is observed through an ocular system. Thus, since a visual field as well as the field frame can be clearly recognized with little flare, the view of the visual field is very fine. As such, in recent years, the real image mode finders have been often used as finders for high-grade lens shutter cameras.

Real image mode finders which are mountable in single focus cameras are disclosed, for example, by Japanese Patent Preliminary Publication Nos. Hei 3-289611 and Hei 7-128591. Each of such finders is constructed with an objective system including a single positive lens, a prism having four reflecting surfaces for forming an erect image, and an ocular system including a single positive lens. These finders, however, are such that a distance between the objective system and the prism, namely the back focal distance of an objective lens, becomes an unnecessary space, which constitutes an obstacle to compactness of the finder.

The finder magnification is the ratio between the focal lengths of the objective system. The ocular system, and the focal length of the ocular system is practically governed by the optical path length of the prism. Hence, where a prism that has four reflecting surfaces is used, the focal length of the ocular system is so long that it becomes difficult to obtain a high magnification. In this way, with the finders set forth in the above-mentioned prior art publications, it is difficult that the compactness and high-magnification of the finder.

Japanese Patent Preliminary Publication No. Hei 6-300966, on the other hand, discloses a finder which includes an objective lens having a single reflecting surface, a prism having three reflecting surfaces, and an eyepiece. This finder, although advantageous for its compactness, lacks the ability to correct aberrations of the optical system itself and cannot completely correct aberrations because a surface, directed toward an eyepoint, of the objective lens is located close to the intermediate image plane.

Further, a finder disclosed in Japanese Patent Preliminary Publication No. Sho 63-226616 is constructed with an objective system, a first prism having a single reflecting surface, a second prism having three reflecting surfaces, and an ocular system. Since the objective system of this finder is composed of two lenses of negative and positive powers, it cannot be conscientiously said that the finder is compactly designed. In this finder, the entrance surface of the first prism is curved so that the first prism also has the function of a field lens.

In any of the real image node finders described above, it is difficult to obtain compactness, and it is further difficult to attain high-magnification design and favorable correction for aberrations at the same time.

SUMMARY OF THE INVENTION

It is, therefore, an object of the present invention to provide a real image mode finder optical system in which, even with the use of four optical parts, compactness is completely achieved and a finder of high magnification is attained.

Another object of the present invention is to provide a real image mode finder optical system in which aberrations can be favorably corrected and a pupil diameter is so large that an observer can look through the finder with great ease.

In order to accomplish these objects, according to one aspect of the present invention, the real image mode finder optical system comprises, in order from the object side, an objective system constructed with an objective lens including a single lens with positive refracting power and a first reflecting member, an Intermediate image plane, and an ocular system constructed with a second reflecting member and an eyepiece including a single lens with positive refracting power. In this case, the real image mode finder optical system also satisfies the following conditions:

$$-4 < r_1/r_2 < -1, \ r_2 < 0 \tag{1}$$

where $r_1$ and $r_2$ are radii of curvature of the surfaces of the objective lens which are located on the object and image sides, respectively.

According to another aspect of the present Invention, the real image mode optical system comprises, in order from the object side, an objective system constructed with an objective lens including a single lens with positive refracting power and a first reflecting member, an intermediate image plane, and an ocular system constructed with a second reflecting member and an eyepiece including a single lens with positive refracting power. The real image mode optical system, in this case, also satisfies the following condition:

$$1.51 < n_d \tag{2}$$

where $n_d$ is the refractive index of the material for each of the first and second reflecting members for the d-line.

According to still another aspect of the present invention, the real image mode finder optical system comprises, in order from the object side, an objective system constructed with an objective lens including a single lens with positive refracting power and a first reflecting member, an intermediate image plane, and an ocular system constructed with a second reflecting member and an eyepiece including a single lens with positive refracting power, and the surfaces of the objective lens are configured to be aspherical.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 6 is a sectional view showing the arrangement, developed along the optical axis, of the real image mode finder optical system of a second embodiment in the present invention;

FIGS. 7A, 7B, and 7C are diagrams showing aberration characteristics at an infinite object point of the finder optical system of the second embodiment;

FIG. 8 is a sectional view showing the arrangement, developed along the optical axis, of the real image mode finder optical system of a third embodiment in the present invention;

FIGS. 9A, 9B, and 9C are diagrams showing aberration characteristics at an infinite object point of the finder optical system of the third embodiment;

FIG. 10 is a sectional view showing the arrangement, developed along the optical axis, of the real image mode finder optical system of a fourth embodiment in the present invention;

FIGS. 11A, 11B, and 11C are diagrams showing aberration characteristics at an infinite object point of the finder optical system of the fourth embodiment;

DETAILED DESCRIPTION OF THE PREFERRED EMBODIMENTS

Figure 1:
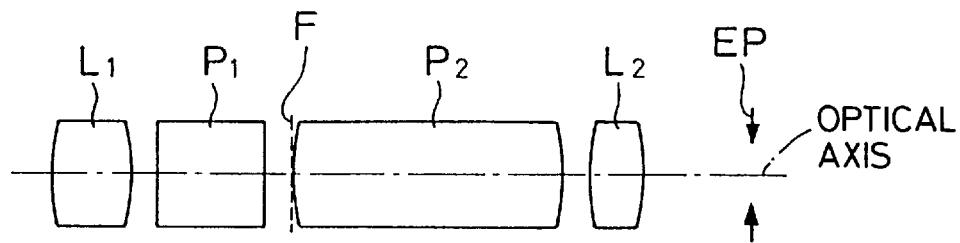
FIG. 1 is a conceptual view for explaining the arrangement of the real image mode finder optical system according to the present invention.

Before undertaking the explanation of the embodiments, a description will be given of the general concept of the real image mode finder optical system according to the present invention. In FIG. 1, the finder optical system of the present invention comprises, in order from the object side, an objective lens $L_1$ including a single lens with positive refracting power, a first reflecting member (prism) $P_1$, an intermediate image plane F, a second reflecting member (prism) $P_2$, and an eyepiece $L_2$ including a single lens with positive refracting power. The objective lens $L_1$ and the first reflecting member $P_1$ constitutes an objective system, while the second reflecting member $P_2$ and the eyepiece $L_2$ constitutes an ocular system.

Reference symbol EP denotes an eyepoint

Thus, in the real image mode finder optical system of the present invention, since the first reflecting member $P_1$ is placed at the back focal distance of the objective lens $L_1$, an effective use of space is acquired and the optical path length of the second reflecting member $P_2$ can be reduced. In this way, it becomes possible to obtain the compactness of the finder optical system. At the same time, the number of degrees of design freedom is increased according to how each of the prisms used as a reflecting member is configured to bend an optical path, and thus, when the finder optical system is mounted in a camera, the layout of the finder optical system is facilitated. Furthermore, when the optical path length of the second reflecting member $P_2$ is reduced, the focal length of the eyepiece $L_2$ is also reduced, and hence a finder optical system of high magnification can be secured.

At this time, in order to afford a fine view of the visual field of the finder optical system, it becomes necessary that objective lens $L_1$ satisfies Eq. (1). Condition (1). Condition (1) serves to determine the configuration of the objective lens required to correct for curvature of field and distortion while maintaining an adequate balance between them. If the value of the term $r_1/r_2$ or $r_2$ oversteps the upper limits imposed by condition (1), the result becomes advantageous for correction for curvature of field, while below the lower limit, it becomes advantageous to correction for distortion. In order to correct for both aberrations while maintaining an adequate balance between them, it is desirable that the value is within the limit defined by condition (1).

Also, for the real image mode finder optical system according to the present invention, in order to correct for aberrations with a higher degree of accuracy, it is desirable that the values of $r_1/r_2$ and $r_2$ satisfy the following conditions:

$$-4 < r_1/r_2 < -2.5, \; r2 << 0 \tag{3}$$

Most of the finder optical systems have been designed to have a pupil diameter of about 4 mm, but in view of making it easy for an observer to look through the finder, it is rather favorable that the pupil diameter should be as large as possible. If the pupil diameter is made larger, vignetting of the visual field of the finder will be obviated which is caused when the observer's eye is moved up and down or from side to side.

Figure 2:
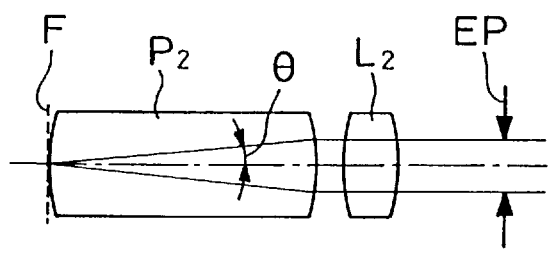
FIG. 2 is a view for explaining the condition of total reflection in the real image mode finder optical system of the present invention.

FIG. 2 shows the arrangement of the ocular system of the finder optical system in the present invention. An angle $\theta$ made by an axial beam of light with the optical axis is determined in accordance with the size of the pupil diameter and the optical path length of the second reflecting member (prism) $P_2$ of the ocular system. Whether or not the condition of total reflection is fulfiled depends on the values of the angle of the reflecting surface of the second reflecting member $P_2$ and the angle $\theta$. In general, the optical path length of the prism depends chiefly on the focal length of the eyepiece, but the focal length of the eyepiece is set at a nearly constant value In view of correction for aberrations, and as such the angle $\theta$ will be influenced by only the size of the pupil diameter.

When the pupil diameter is enlarged, utmost care must be given to the material of each prism placed in the finder optical system. For example, where the finder optical system includes a prism constructed of acrylic resin and a beam of light with a diameter above 4 mm is introduced into this prism, the condition of total reflection cannot be satisfied with the reflecting surface of the prism, and the enlargement of the pupil diameter will be meaningless.

Here, if attention is directed to only a certain reflecting surface of a plurality of reflecting surfaces, this reflecting surface is capable of bringing about total reflection by changing an angle made by the reflecting surface, but for other reflecting surfaces, the condition of total reflection is worsened, which is unfavorable.

Thus, in the real image mode finder optical system of the present invention, where the pupil diameter is increased to, for example, 5 mm, it is desirable to use the reflecting member (prism) constructed of material such that condition (2) is satisfied. In this way, the finder optical system of the present invention allows the pupil diameter to be enlarged and provides a finder through which a observer can easily look.

Moreover, the real image mode finder optical system of the present invention is capable of securing uniformity of the entire visual field by satisfying condition (1), but in order to obtain a good image, it is also necessary to correct for spherical aberration and coma. For this purpose, it is desirable that aspherical surfaces are applied to the objective lens and the eyepiece. In particular, where the pupil diameter is enlarged, it is desirable that both of the surfaces of the objective lens are configured to be aspherical. In this case, it is also desirable that each of the aspherical surfaces of the objective lens has such a shape that its refracting power diminishes progressively in going from the center to the periphery.

In accordance with the embodiments shown in the drawings, the present invention will be explained in detail below.

First embodiment

Figure 3:
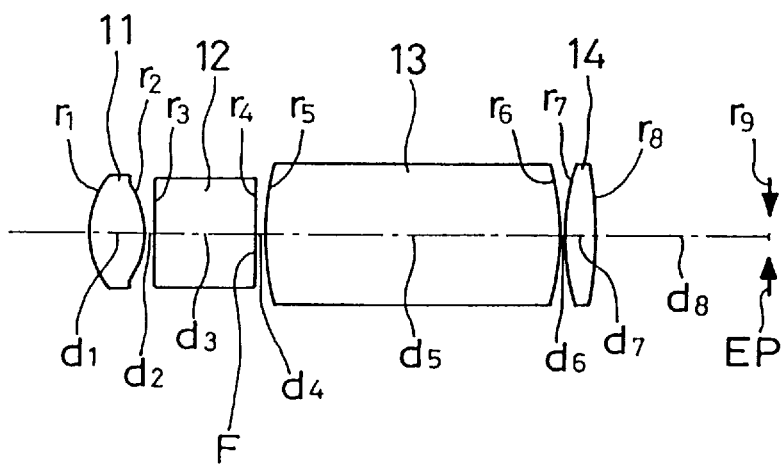
FIG. 3 is a sectional view showing the arrangement, developed along the optical axis, of the real image mode finder optical system of a first embodiment in the present invention.

The finder optical system of this embodiment, as shown In FIG. 3, comprises, in order from the object side, an objective lens 11 including a biconvex lens, a first prism 12 having a single reflecting surface, a second prism 13 having three reflecting surfaces, and an eyepiece 14 including a biconvex lens.

Figure 4:
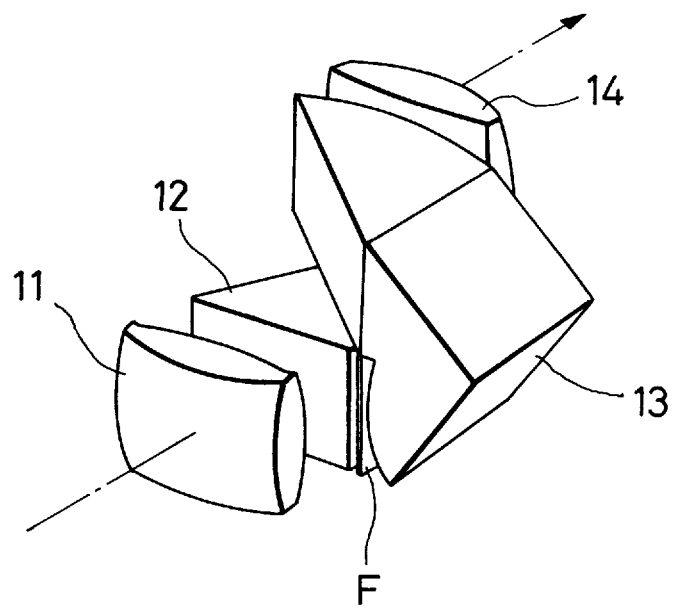
FIG. 4 is a perspective view showing the arrangement of lenses and prisms when the optical system of the first embodiment is mounted in a camera.

In the real image mode finder optical system of the first embodiment, the surface, situated on the side of the eyepoint EP, of the objective lens 11 and the surface, situated on the object side, of the eyepiece 14 are configured to be aspherical. The first and second prisms 12 and 13 are constructed of acrylic resin, and the exit surface of the first prism 12 constitutes the intermediate image plane F. The arrangement of the lenses and prisms when the optical system of the first embodiment is mounted in a camera is as shown In FIG. 4, for instance.

The following are numerical data of optical members, such as lenses, constituting the real image mode finder optical system of the first embodiment.

| Finder magnification | 0.45x | | |
|---|---|---|---|
| Field angle (2ω) | 56.2° | | |
| Pupil diameter φ | 4 mm | | |
| $r_1 = 9.459$ | | | |
| $d_1 = 5.00$ | | $n_1 = 1.49241$ | $\upsilon_1 = 57.66$ |
| $r_2 = -6.602$ (aspherical) | | | |
| $d_2 = 0.90$ | | | |
| $r_3 = \infty$ | | | |
| $d_3 = 9.50$ | | $n_3 = 1.49241$ | $\upsilon_3 = 57.66$ |
| $r_4 = \infty$ | | | |
| $d_4 = 1.00$ | | | |
| $r_5 = 35.000$ | | | |
| $d_5 = 27.00$ | | $n_5 = 1.49241$ | $\upsilon_5 = 57.66$ |
| $r_6 = -25.861$ | | | |
| $d_6 = 0.40$ | | | |
| $r_7 = 23.054$ (aspherical) | | | |
| $d_7 = 2.80$ | | $n_7 = 1.49241$ | $\upsilon_7 = 57.66$ |
| $r_8 = -43.737$ | | | |
| $d_8 = 16.00$ | | | |
| $r_9$ (eyepoint) | | | |

Conic constants and aspherical coefficients

Second surface $\kappa = -0.141$
$A_4 = 1.0728 \times 10^{-3}, A_6 = 3.2536 \times 10^{-6},$
$A_8 = 1.8439 \times 10^{-7}$ Seventh surface $\kappa = 1.800$
$A_4 = -3.9571 \times 10^{-5}, A_6 = 5.0131 \times 10^{-7},$
$A_8 = -1.3115 \times 10^{-8}$ The values of parameters shown in conditions (1) and (2) in the real image mode finder optical system of the first embodiment are as follows:

$r_1/r_2 = -1.43$ $n_d = 1.492$

Figures 5A, 5B, 5C:
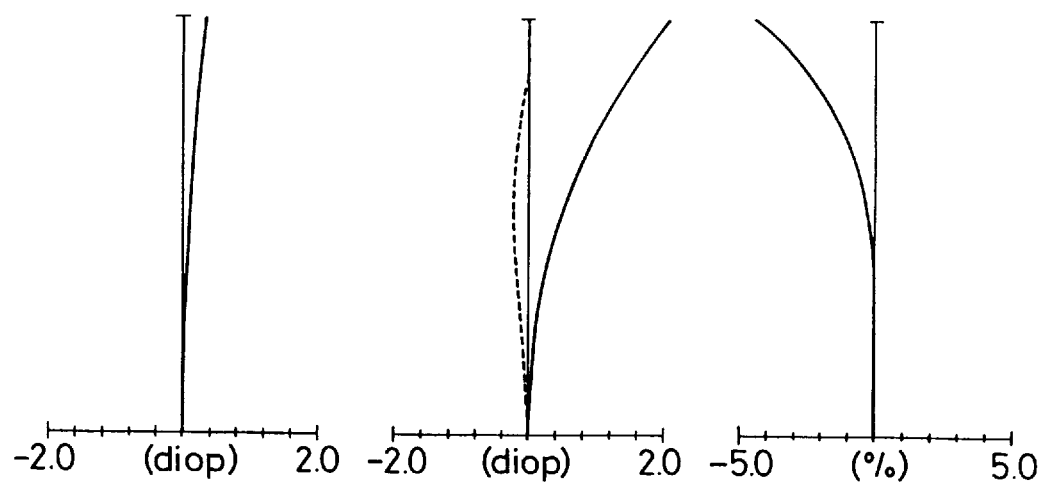
FIGS. 5A, 5B, and 5C are diagrams showing aberration characteristics at an infinite object point of the finder optical system of the first embodiment.

FIGS. 5A, 5B, and 5C show characteristics of spherical aberration, curvature of field, and distortion, respectively, at an infinite object point of the finder optical system of the first embodiment.

Second embodiment

The finder optical system of this embodiment, as shown in FIG. 6, comprises, in order from the object side, an objective lens 21 including a biconvex lens, a first prism 22 having a single reflecting surface, a second prism 23 having three reflecting surfaces, and an eyepiece 24 including a biconvex lens.

In the real image mode finder optical system of the second embodiment, the surfaces of the objective lens 21 and only the surface, located on the object side, of the eyepiece 24 are configured to be aspherical. The first and second prisms 22 and 23 are constructed of acrylic resin, and the entrance surface of the second prism 23 constitutes the intermediate image plane F.

The following are numerical data of optical members, such as lenses, constituting the real image mode finder optical system of the second embodiment.

| Finder magnification | 0.45x | | |
|---|---|---|---|
| Field angle (2ω) | 54.2° | | |
| Pupil diameter φ | 4 mm | | |
| $r_1 = 18.641$ (aspherical) | | | |
| $d_1 = 6.00$ | | $n_1 = 1.49241$ | $\upsilon_1 = 57.66$ |
| $r_2 = -5.046$ (aspherical) | | | |
| $d_2 = 0.50$ | | | |
| $r_3 = \infty$ | | | |
| $d_3 = 9.50$ | | $n_3 = 1.49241$ | $\upsilon_3 = 57.66$ |
| $r_4 = \infty$ | | | |
| $d_4 = 1.00$ | | | |
| $r_5 = 60.000$ | | | |
| $d_5 = 27.00$ | | $n_5 = 1.49241$ | $\upsilon_5 = 57.66$ |
| $r_6 = \infty$ | | | |
| $d_6 = 0.40$ | | | |
| $r_7 = 19.625$ (aspherical) | | | |
| $d_7 = 2.80$ | | $n_7 = 1.49241$ | $\upsilon_7 = 57.66$ |
| $r_8 = -17.916$ | | | |
| $d_8 = 16.00$ | | | |
| $r_9$ (eyepoint) | | | |

Conic constants and aspherical coefficients

First surface $\kappa = 0.200$
$A_4 = -3.4264 \times 10^{-4}, A_6 = -3.5389 \times 10^{-5},$
$A_8 = -5.5786 \times 10^{-7}$ Second surface $\kappa = -0.250$
$A_4 = 1.0533 \times 10^{-3}, A_6 = -1.2014 \times 10^{-5},$
$A_8 = 2.4697 \times 10^{-7}$ Seventh surface $\kappa = 0.500$
$A_4 = -9.8674 \times 10^{-5}, A_6 = 1.0351 \times 10^{-6},$
$A_8 = -2.2932 \times 10^{-8}$ The values of parameters shown in conditions (1) and (2) in the real image mode finder optical system of the second embodiment are as follows:

$r_1/r_2 = -3.69$ $n_d = 1.492$

FIGS. 7A, 7B, and 7C show characteristics of spherical aberration, curvature of field, and distortion, respectively, at an infinite object point of the finder optical system of the second embodiment.

Third embodiment

The finder optical system of this embodiment, as shown in FIG. 8, comprises, in order from the object side, an objective lens 31 including a biconvex lens, a first prism 32 having a single reflecting surface, a second prism 33 having three reflecting surfaces, and an eyepiece 34 including a biconvex lens. The pupil diameter is enlarged to 5 mm.

In the real image mode finder optical system of the third embodiment, the surfaces of the objective lens 31 and only the surface, located on the side of the eyepoint EP, of the eyepiece 34 are configured to be aspherical. Each of the first and second prisms 32 and 33 is constructed of amorphous polyolefin-based material, and the entrance surface of the second prism 33 constitutes the intermediate image plane F.

The following are numerical data of optical members, such as lenses, constituting the real image mode finder optical system of the third embodiment.

| Finder magnification | 0.45x |
| Field angle (2ω) | 56.7° |
| Pupil diameter φ | 5 mm |

$r_1 = 11.191$ (aspherical)
  $d_1 = 4.00$    $n_1 = 1.49241$    $\upsilon_1 = 57.66$
$r_2 = -6.238$ (aspherical)
  $d_2 = 0.60$
$r_3 = \infty$
  $d_3 = 9.40$    $n_3 = 1.52542$    $\upsilon_3 = 55.78$
$r_4 = \infty$
  $d_4 = 1.00$
$r_5 = 28.000$
  $d_5 = 26.70$    $n_5 = 1.52542$    $\upsilon_5 = 55.78$
$r_6 = -57.647$
  $d_6 = 1.50$
$r_7 = 20.611$
  $d_7 = 2.80$    $n_7 = 1.49241$    $\upsilon_7 = 57.66$
$r_8 = -24.484$ (aspherical)
  $d_8 = 16.00$
$r_9$ (eyepoint)

Conic constants and aspherical coefficients

First surface $\kappa = -0.600$
$A_4 = 1.4727 \times 10^{-4}$, $A_6 = -2.3233 \times 10^{-5}$,
$A_8 = 1.9346 \times 10^{-7}$
Second surface $\kappa = 0$
$A_4 = 1.1318 \times 10^{-3}$, $A_6 = -7.2608 \times 10^{-6}$,
$A_8 = 0$
Eighth surface $\kappa = -0.600$
$A_4 = 5.6612 \times 10^{-5}$, $A_6 = -1.0739 \times 10^{-6}$,
$A_8 = 1.8723 \times 10^{-8}$ The values of parameters shown in conditions (1) and (2) in the real image mode finder optical system of the third embodiment are as follows:

$r_1/r_2 = -1.79$ $n_d = 1.525$

FIGS. 9A, 9B, and 9C show characteristics of spherical aberration, curvature of field, and distortion, respectively, at an infinite object point of the finder optical system of the third embodiment.

Fourth embodiment

The finder optical system of this embodiment, as shown in FIG. 10, comprises, in order from the object side, an objective lens 41 including a biconvex lens, a first prism 42 having a single reflecting surface, a second prism 43 having three reflecting surfaces, and an eyepiece 44 including a biconvex lens. The pupil diameter is enlarged to 5 mm.

In the real image mode finder optical system of the fourth embodiment, all the surfaces of the objective lens 41 and the eyepiece 44 are configured to be aspherical. Each of the first and second prisms 42 and 43 is constructed of amorphous polyolefin-based material, and the entrance surface of the second prism 43 constitutes the intermediate image plane F.

The following are numerical data of optical members, such as lenses, constituting the real image mode finder optical system of the fourth embodiment.

| Finder magnification | 0.45x |
| Field angle (2ω) | 56.6° |
| Pupil diameter φ | 5 mm |

$r_1 = 13.576$ (aspherical)
  $d_1 = 4.00$    $n_1 = 1.49241$    $\upsilon_1 = 57.66$
$r_2 = -5.747$ (aspherical)
  $d_2 = 0.65$
$r_3 = \infty$
  $d_3 = 9.60$    $n_3 = 1.52542$    $\upsilon_3 = 55.78$
$r_4 = \infty$
  $d_4 = 1.00$
$r_5 = 31.000$
  $d_5 = 27.80$    $n_5 = 1.52542$    $\upsilon_5 = 55.78$
$r_6 = -72.751$
  $d_6 = 0.50$
$r_7 = 21.861$ (aspherical)
  $d_7 = 2.80$    $n_7 = 1.49241$    $\upsilon_7 = 57.66$
$r_8 = -21.429$ (aspherical)
  $d_8 = 16.00$
$r_9$ (eyepoint)

Conic constants and aspherical coefficients

First surface $\kappa = 0$
$A_4 = 4.3297 \times 10^{-4}$, $A_6 = -8.4158 \times 10^{-5}$,
$A_8 = 7.3362 \times 10^{-7}$
Second surface $\kappa = 0$
$A_4 = 1.4890 \times 10^{-3}$, $A_6 = -3.8804 \times 10^{-5}$,
$A_8 = 0$
Seventh surface $\kappa = 2.000$
$A_4 = -1.4229 \times 10^{-4}$, $A_6 = 9.4697 \times 10^{-7}$,
$A_8 = -1.8166 \times 10^{-8}$
Eighth surface $\kappa = -2.000$
$A_4 = -7.2694 \times 10^{-5}$, $A_6 = 0$,
$A_8 = 0$ The values of parameters shown in conditions (1) and (2) in the real image mode finder optical system of the fourth embodiment are as follows:

$r_1/r_2 = -2.36$ $n_d = 1.525$

FIGS. 11A, 11B, and 11C show characteristics of spherical aberration, curvature of field, and distortion, respectively, at an infinite object point of the finder optical system of the fourth embodiment.

Fifth embodiment

Figure 12:
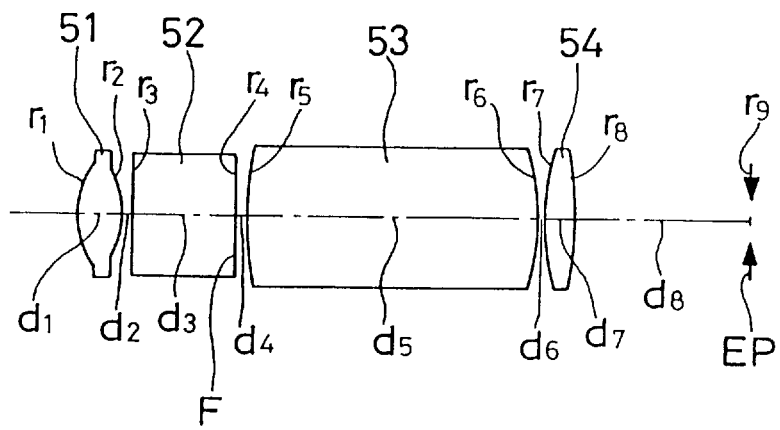
FIG. 12 is a sectional view showing the arrangement, developed along the optical axis, of the real image mode finder optical system of a fifth embodiment in the present invention.

The finder optical system of this embodiment, as shown in FIG. 12, comprises, in order from the object side, an objective lens 51 including a biconvex lens, a first prism 52 having a single reflecting surface, a second prism 53 having three reflecting surfaces, and an eyepiece 54 including a biconvex lens.

In the real image mode finder optical system of the fifth embodiment, all the surfaces of the objective lens 51 and the eyepiece 54 are configured to be aspherical. The first and second prisms 52 and 53 are constructed of acrylic resin, and the exit surface of the first prism 52 constitutes the intermediate image plane F.

The following are numerical data of optical members, such as lenses, constituting the real image mode finder optical system of the fifth embodiment.

| | |
|---|---|
| Finder magnification | 0.45x |
| Field angle (2ω) | 56.7° |
| Pupil diameter φ | 4 mm |

$r_1$ = 8.497 (aspherical)
    $d_1$ = 4.00        $n_1$ = 1.49241    $\nu_1$ = 57.66
$r_2$ = −7.469 (aspherical)
    $d_2$ = 1.00
$r_3$ = ∞
    $d_3$ = 9.60        $n_3$ = 1.49241    $\nu_3$ = 57.66
$r_4$ = ∞
    $d_4$ = 1.00
$r_5$ = 40.000
    $d_5$ = 27.00       $n_5$ = 1.49241    $\nu_5$ = 57.66
$r_6$ = −23.045
    $d_6$ = 0.50
$r_7$ = 23.368 (aspherical)
    $d_7$ = 2.80        $n_7$ = 1.49241    $\nu_7$ = 57.66
$r_8$ = −53.118 (aspherical)
    $d_8$ = 16.00
$r_9$ (eyepoint)

Conic constants and aspherical coefficients

First surface

κ = 0.160
$A_4$ = −6.4325 × $10^{-4}$, $A_6$ = −2.3087 × $10^{-5}$,
$A_8$ = 5.2720 × $10^{-7}$
Second surface κ = 0
$A_4$ = 1.0803 × $10^{-3}$, $A_6$ = −6.1514 × $10^{-5}$,
$A_8$ = 3.6378 × $10^{-6}$
Seventh surface κ = −1.000
$A_4$ = −3.0205 × $10^{-5}$, $A_6$ = 8.9148 × $10^{-7}$,
$A_8$ = −2.3452 × $10^{-8}$
Eighth surface

κ = 5.200
$A_4$ = −1.9550 × $10^{-5}$, $A_6$ = 0,
$A_8$ = 0

The values of parameters shown in conditions (1) and (2) in the real image mode finder optical system of the fifth embodiment are as follows:

$r_1/r_2$ = −1.14
$n_d$ = 1.492

Figures 13A, 13B, 13C:
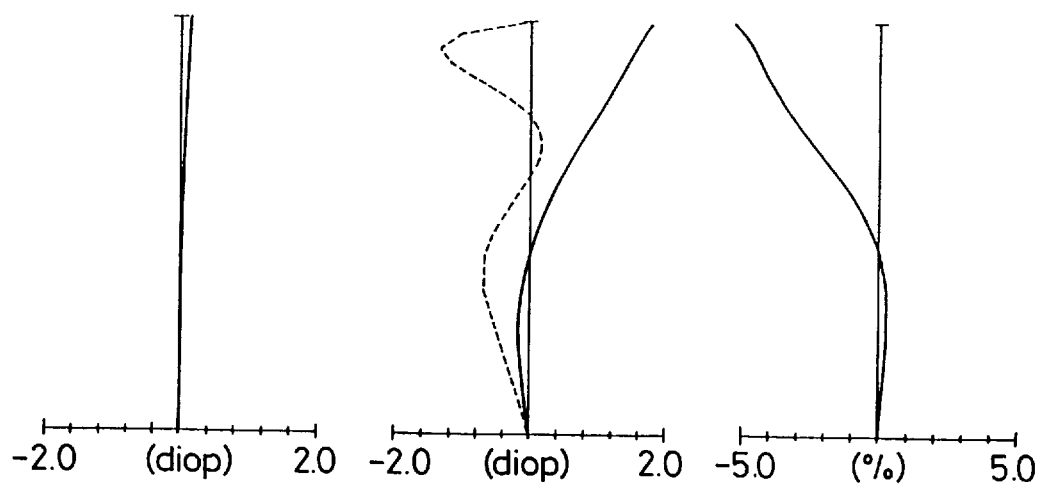
FIGS. 13A, 13B, and 13C are diagrams showing aberration characteristics at an infinite object point of the finder optical system of the fifth embodiment.

FIGS. 13A, 13B, and 13C show characteristics of spherical aberration, curvature of field, and distortion, respectively, at an infinite object point of the finder optical system of the fifth embodiment.

In the numerical data of the above embodiments, $r_1, r_2, \ldots$ represent radii of curvature of individual lens or prism surfaces; $d_1, d_2, \ldots$ thicknesses of individual lenses or prisms, or spaces there-between; $n_1, n_2, \ldots$ refractive indices of individual lenses or prisms; and $\nu_1, \nu_2, \ldots$ Abbe's numbers of individual lenses or prisms.

Also, the configuration of the aspherical surface in each of the embodiments is given by the following equation:

$$Z = \frac{Y^2/r}{1 + \sqrt{1 - (1+\kappa)(Y/r)^2}} + A_4 Y^4 + A_6 Y^6 + A_8 Y^8$$

where Z is the coordinate in the direction of the optical axis, Y is the coordinate in the direction normal to the optical axis, κ is a conic constant, and $A_4$, $A_6$, and $A_8$ are aspherical coefficients.

Where the pupil diameter is enlarged as in the finder optical systems shown by the third and fourth embodiments, the use of the prisms constructed of ploycarbonate resin allows aberrations to be corrected more effectively. Additionally, if there is no need to consider cost, it is possible cost for a mirror coating to be applied to each of the reflecting surfaces of the prisms, or for each reflecting surface to be constructed with a mirror. This case, however, is attended with a reduction in reflectance, and thus the visual field of the finder necessarily becomes somewhat dark.

What is claimed:

1. A real image mode finder optical system comprising, in order from an object side:
    an objective system including:
        an objective lens consisting of a single lens with positive refracting power, said objective lens having a single focal length, and
        a first reflecting member;
    an intermediate image plane; and
    an ocular system including:
        a second reflecting members and
        an eyepiece including a single lens with positive refracting power,
    said first reflecting member including a prism and being arranged to reflect rays once and said second reflecting member including another prism and being arranged to reflect the rays three times, so that an image is erected, and
    entrance and exit surfaces of each of said second reflecting member and said eyepiece individually having a light converging function.

2. A real image mode finder optical system according to claim 1, wherein said single lens of said object lens is a double-convex lens.

3. A real image mode finder optical system according to claim 1, wherein said objective lens satisfies the following conditions:

$$-4 < r_1/r_2 < -1,\ r_2 < 0$$

where $r_1$ and $r_2$ are radii of curvature of an object-side surface and an image-side surface of said single lens of said objective lens, respectively.

4. A real image mode finder optical system according to claim 3, wherein said objective lens further satisfies the following condition:

$$-4 < r_1/r_2 < -2.5.$$

5. A real image mode finder optical system according to claim 1, 2, 3 or 4, wherein said real image mode finder optical system satisfies the following condition:

$$1.51 < n_4$$

where $n_4$ is a refractive index of material of each of said first reflecting member and said second reflecting member for d-line rays.

6. A real image mode finder optical system according to claim 5, wherein said finder optical system is constructed to have a pupil diameter of 5 mm.

7. A real image mode finder optical system comprising, in order from an object side:
    an objective system including:
        an objective lens consisting of a single lens with positive refracting power, said objective lens having a single focal length, and
        a first reflecting member;
    an intermediate image plane; and
    an ocular system including:

a second reflecting member, and an eyepiece including a single lens with positive refracting power, wherein both surfaces of said objective lens are configured to be aspherical, and wherein each of said first reflecting member and said second reflecting member includes a prism, and entrance and exit surfaces of each of said second reflecting member and said eyepiece individually have a light converging function.

8. A real image mode finder optical system according to claim 7, wherein said objective lens satisfies the following conditions:

$$-4 < r_1/r_2 < -1, \ r_2 < 0$$

where $r_1$, and $r_2$ are radii of curvature of an object-side surface and an image-side surface of said single lens of said objective lens, respectively.

9. A real image mode finder optical system according to claim 8, wherein said objective lens further satisfies the following condition:

$$-4 < r_1/r_2 < -2.5.$$

10. A real image mode finder optical system according to claim 7, wherein said single lens of said objective lens is a double-convex lens.

11. A real image mode finder optical system according to claim 7, 8, 9 or 10, wherein said real image mode finder optical system satisfies the following condition:

$$1.51 < n_4$$

where $n_4$ is a refractive index of material of each of said first reflecting member and said second reflecting member for d-line rays.

12. A real image mode finder optical system according to claim 11, wherein said finder optical system is constructed to have a pupil diameter of 5 mm.

* * * * *